United States Patent
Mueller et al.

[11] Patent Number: 5,934,614
[45] Date of Patent: Aug. 10, 1999

[54] CLOSED LOOP CONTROL SYSTEM FOR CONTROLLING AN AIR DISCHARGE OUT OF AN AIRCRAFT BODY

[75] Inventors: Wolfgang Mueller, Beckdorf; Bernd Klein, Hamburg, both of Germany

[73] Assignee: DaimlerChrysler Aerospace Airbus GmbH, Hamburg, Germany

[21] Appl. No.: 08/891,519

[22] Filed: Jul. 11, 1997

[30] Foreign Application Priority Data

Jul. 13, 1996 [DE] Germany .......................... 196 28 395

[51] Int. Cl.⁶ .................................................. B64D 13/04
[52] U.S. Cl. ......................................... 244/118.5; 454/76
[58] Field of Search .......................... 244/118.5, 129.1; 454/76, 71, 74, 162

[56] References Cited

U.S. PATENT DOCUMENTS

| | | |
|---|---|---|
| 3,679,156 | 7/1972 | Redmond, Jr. ............................. 244/78 |
| 3,740,006 | 6/1973 | Maher ................................. 244/129 D |
| 4,436,018 | 3/1984 | Murphy et al. .......................... 244/178 |
| 4,651,045 | 3/1987 | Wagner ..................................... 244/78 |
| 4,807,516 | 2/1989 | Takats ..................................... 244/194 |
| 5,001,638 | 3/1991 | Zimmerman et al. ................ 244/76 R |
| 5,046,686 | 9/1991 | Carla et al. .......................... 244/118.5 |
| 5,273,486 | 12/1993 | Emmons et al. ..................... 244/118.5 |
| 5,274,554 | 12/1993 | Takats et al. ......................... 244/76 R |

*Primary Examiner*—Galen L. Barefoot
*Attorney, Agent, or Firm*—W. F. Fasse; W. G. Fasse

[57] ABSTRACT

The flow volume of used air to be discharged from an aircraft cabin is controlled in a valve control system in which each outflow valve has at least two slave controllers responsive to any one of at least two master controllers in a closed loop control system. For this purpose the slave controllers and the master controllers are interconnected by an intermeshed conductor network including a plurality of conductor sections interconnected by electrical conductor junctions or optical conductor couplers forming interfaces between the conductor sections to provide a redundant number of communication paths to keep the system operable even if failures or faults occur.

12 Claims, 2 Drawing Sheets

CLOSED LOOP CONTROL SYSTEM FOR CONTROLLING AN AIR DISCHARGE OUT OF AN AIRCRAFT BODY

FIELD OF THE INVENTION

The invention relates to controlling the discharge of used-up air out of an enclosed space, particularly an aircraft body. Redundant control paths must be provided to assure or at least increase the probability of a proper operation even when there are faults in the system.

BACKGROUND INFORMATION

Conventionally, outflow valves for controlling the volume of used air to be discharged out of a passenger aircraft body are controlled by closed loop controllers through unidirectional databuses. Each closed loop controller supplies a control signal or valve adjustment value through a separate databus to the respective outflow valve or valves. These valves are distributed along the length of the aircraft body and provide an air passage from the inside of the aircraft body to the atmosphere. In response to such a control the valves discharge regulated volumes of used air to the atmosphere. A further feedback databus is provided for each valve to provide feedback information regarding the current status of the respective valve to the closed loop controller.

Such a conventional system requires a total of eight databuses for each valve in the system. Four of one-way databuses connect two master controllers to two slave valve controllers and four one-way return databuses connect the slave valve controllers with master controllers, for supplying feedback information to the master controllers. In spite of this number of databuses, the conventional systems are not constructed to increase the reliability of the system. Moreover, each master controller can control only the outflow or air discharge valve to the slave controllers of which it is connected. Intercommunication between any master controller and any one of a plurality of slave valve controllers is conventionally not possible. Another drawback of such conventional systems is seen in that a two-way intercommunication between all components of the system is either not possible at all or at least economically not feasible.

OBJECTS OF THE INVENTION

In view of the above it is the aim of the invention to achieve the following objects singly or in combination:

to construct a used air discharge system for an aircraft in such a way that a variable and two-way information exchange is possible between any component of the system with any other component of the system;

such a system must be capable of responding flexibly to system faults and emergencies;

the system shall be economical, yet sufficiently reliable to meet official aircraft construction standards;

such a system must also be lightweight with due regard to the ever present demand for increasing the payload of passenger aircraft;

the system must be able to respond to currently prevailing operating conditions in the aircraft especially the pressure within the aircraft cab in; and to make sure that any system component can communicate with any other system components at least to the extent of providing status information to the master controllers, whereby any information transmission shall take place along the shortest possible connection between the respective system components.

SUMMARY OF THE INVENTION

The above objects have been achieved according to the invention by a closed loop control system for controlling an air discharge from an aircraft body having a body wall through which at least one air outflow valve extends. The present closed loop control system in its simplest construction with but one valve is characterized in that the valve is controllable by any one of two slave valve controllers which in turn are controllable by any one of two master controllers. The slave controllers and the master controllers a re interconnected by a signal or information transmission loop for transmitting control information from the master controllers to the slave controllers and for transmitting feedback or other information for example representing the current cabin pressure, from the slave valve controllers and other system components such as air pressure gages, to the master controllers so that each of the master controllers can control any one of the slave controllers and so that return information can reach any one of the master controllers.

Such a system has the advantage that it can be easily extended to virtually any number of valves, whereby the respective signal and information transmission loop is extended by additional conductor sections sufficient to provide the described interconnection between any master controller and any slave controller of the system while simultaneously satisfying the redundancy required by aircraft manufacturing regulations.

Another important advantage of the invention is seen in that the information transmission loop can be provided with an intermeshed conductor system through the simple device of conductor junction boxes or fiber optical couplers depending on whether insulated electrical conductor wires or optical lightwave conductors are used. In both instances virtually any number of parallel and series connected conductor sections may be used to form an intermeshed loop conductor system.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
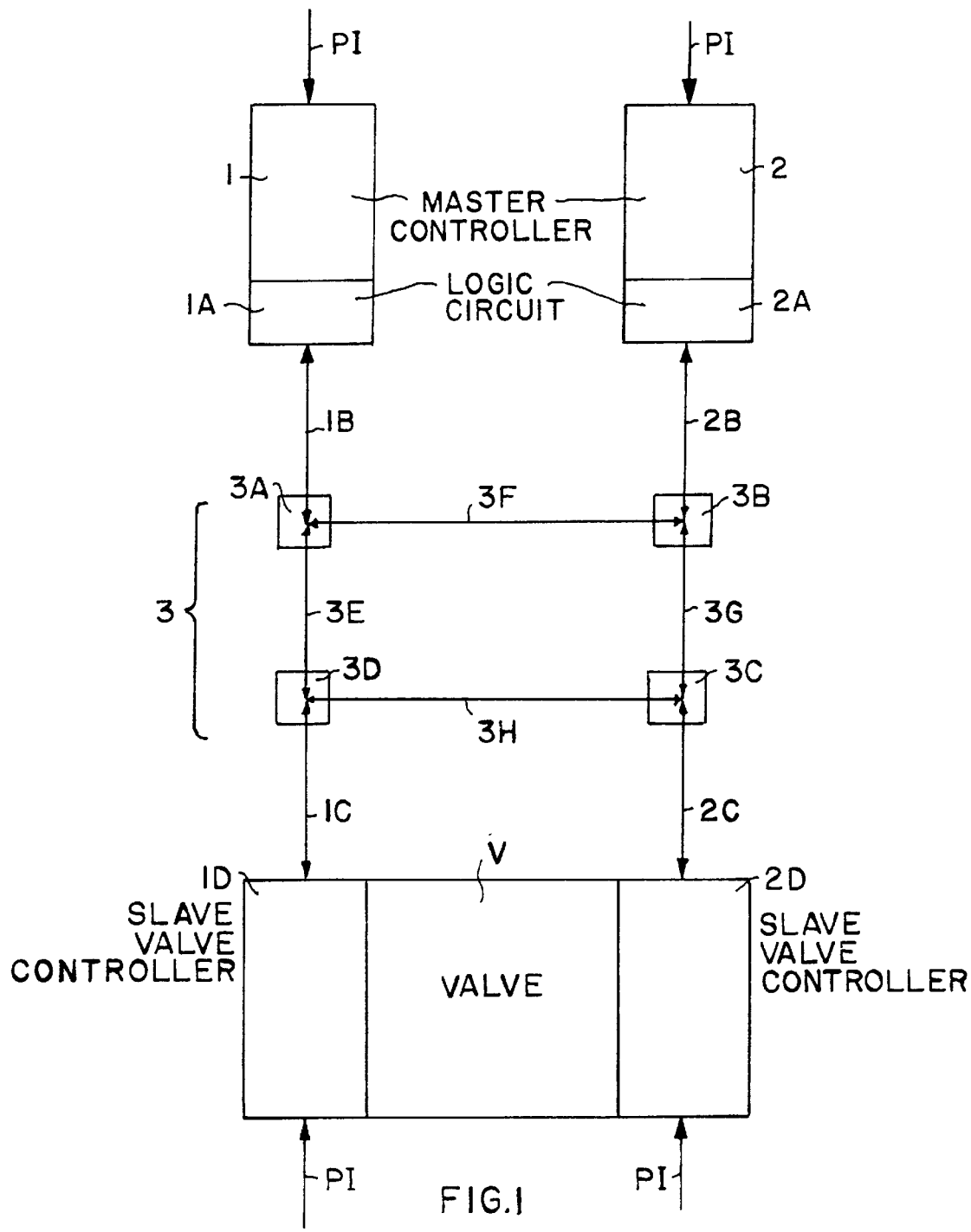
FIG. 1 shows an arrangement with one air outflow valve responsive to two slave valve controllers which in turn are connected through the present transmission loop to two master controllers.
Figure 2:
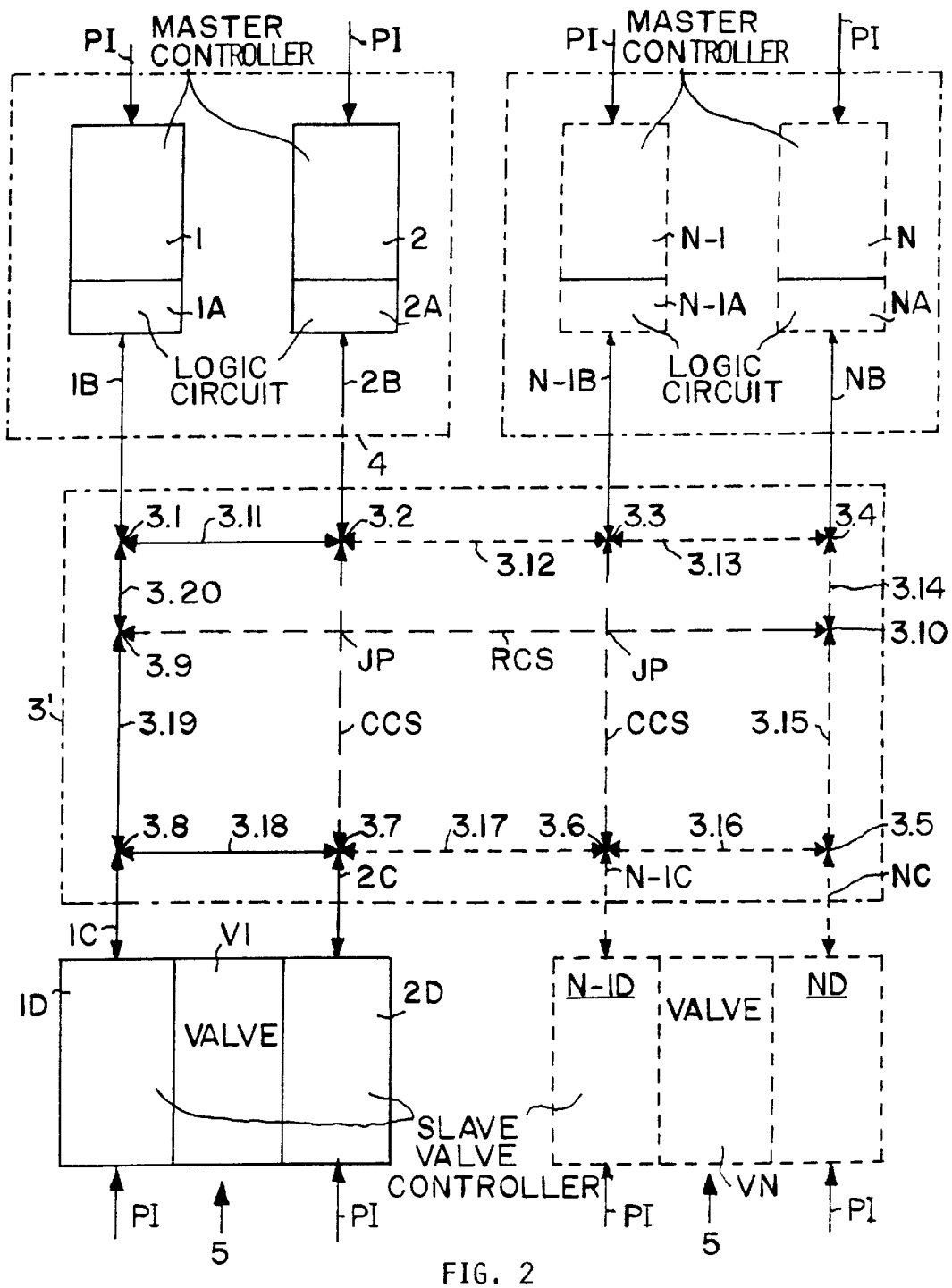
FIG. 2 shows a block diagram similar to that of FIG. 1, however illustrating an expanded system with N-number of valves each having two slave controllers and two master controllers interconnected by an intermeshed conductor loop.

FIG. 1 shows an embodiment with one air discharge valve V which is controllable by two master controllers 1 and 2 controlling in turn two slave valve controllers 1D and 2D. The master controllers 1 and 2 that may be combined to form a unit 4 shown in FIG. 2, are connected to the slave controllers 1D and 2D through a conductor loop 3 and loop entering and exiting conductor sections. More specifically, the master controller 1 which is equipped with a logic signal or information evaluating circuit 1A is connected to the loop 3 by a column conductor section 1B at an interface 3A. The loop 3 in turn is connected to the slave controller 1D by a column conductor section 1C at an interface 3D. Similarly, the master controller 2 also equipped with a logic signal or information evaluating circuit 2A is connected to the loop 3 by a column conductor section 2B at an interface 3B. The loop in turn is connected by a column conductor section 2C to the slave controller 2D at an interface 3C.

The loop is formed by the above mentioned interfaces 3A, 3B, 3C and 3D forming junctions which are interconnected by conductor sections as follows. The interface or junction 3A is connected to the junction or interface 3B by a row conductor section 3F. The interface or junction 3D is connected to the junction or interface 3C by a row connector section 3H. The junction or interface 3B is connected to the junction or interface 3C by a column conductor section 3G. The junction or interface 3A is connected by a column conductor 3E to the junction or interface 3D. Thus, the circular conductor loop 3 is formed.

The interfaces or junctions are, for example, junction boxes where the conductor sections are insulated electrical wires or conductors or these junctions are optical fiber couplers where the conductor sections are lightwave conductors. The arrow heads at each end of the conductor sections indicate that the conductors can transmit signals in either direction.

There are two types of operations possible, namely when the system is free of any fault and when there is one or are more faults in the system. In both instances the system will automatically use the shortest possible information transmission conductor path available under the circumstances or rather under all operating conditions. These "circumstances" are monitored and evaluated by the logic circuits 1A and 2A which provide respective control signals. These "circumstances" may involve, for example, any fault in the system, a current air pressure in the aircraft cabin, other air control parameters, e.g. temperatures and similar considerations that are taken into account in order to make the breathing air as comfortable for the passengers as possible. Each of the master controllers 1 or 2 is intended to be able to control through any one of the slave valve controllers 1D and 2D the respective valve V. The controllers are connected to a power supply input merely symbolically indicated by an arrow PI. These power inputs PI may include a normal power supply and an emergency power supply.

Under a normal operating condition the valve V is operated by the master controller 1 through the following shortest conductor path: master controller 1, logic circuit 1A, conductor section 1B, junction 3A, conductor section 3E, junction 3D, conductor section 1C, slave valve controller 1D.

When there is a fault in the system, for example, the conductor section 3E does not work, the shortest possible conductor path will again be established as follows: 2, 2A, 2B, 3B, 3G, 3C, 2C, 2D. If the controller 2 and the conductor 3E do not work the control can still be accomplished, for example along: 1B, 3A, 3F, 3B, 3G, 3C, 2C.

FIG. 2 illustrates an embodiment in which a plurality of master control units 1, 2, . . . , N-1, and N form control units 4 which are connected to slave valve control units 5 also arranged in pairs so that each valve V1 to VN has two slave valve controllers as described above with reference to FIG. 1.

However, in FIG. 2 the loop is constructed as an interlinked loop 3' wherein a circular or rather an endless loop includes additional conductor sections arranged in rows RCS and columns CCS with further junctions JP to accommodate a larger number of master control units 4 and a correspondingly larger number of controlled or slave controller units 5. Thus, the loop 3' has, for example eight major junctions 3.1, 3.2, 3.3, 3.4, 3.5, 3.6, 3.7, 3.8 and a number of secondary junctions 3.9 and 3.10 interconnected in an endless loop by conductor sections 3.11, 3.12, 3.13, 3.14, 3.15, 3.16, 3.17, 3.18, 3.19, and 3.20 As mentioned, additional junctions may be provided at the crossing or junction points JP between the row conductor sections RCS and column conductor sections CCS. The conductor sections 1B, 2B, N-1B and NB, as well as the conductor sections 1C, 2C, N-1C and NC form part of column conductor links and are simultaneously entrance and exit conductor sections for the endless conductor loop 3'.

The logic signal evaluation circuits 1A, 2A, . . . , N-1A, NA assure that under normal operating conditions and under emergency operating conditions always the shortest interconnection is established. Moreover, the logic circuits make sure that any of the master controllers can control any one of the slave valve controllers, whereby again the shortest available communication link has preference over any longer possible communication link. The logic circuits also assure that any available master controller will control any available slave valve controller for safely operating the respective valve under all operating conditions. If one valve is inoperable for whatever reason, any of the other valves can be operated for the intended purpose of discharging used air from an aircraft body.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A closed loop system for controlling an air discharge out of an aircraft body having a body wall, said system comprising least one air discharge valve for passing used air through said body wall, at least two master controllers for each air discharge valve, at least two slave valve controllers for controlling the operation of said at least one air discharge valve in response to any one of said at least two master controllers, and a ring circuit (3A to 3H) forming an information transmission loop interconnecting said master controllers with said slave valve controllers for transmitting control information from any one of said master controllers to any one of said slave valve controllers and for transmitting feedback information from any one of said slave valve controllers to any one of said master controllers, said ring circuit establishing under all operating conditions the shortest possible conductor path between any one of said master controllers and any one of said slave valve controllers for passing signals from any one of said master controllers to any one of said slave valve controllers and vice versa through said shortest possible conductor path.

2. The closed loop control system of claim 1, wherein said ring circuit forming said information transmission loop comprises a plurality of conductor sections (3E, 3F, 3G, 3H) and interfaces (3A, 3B, 3C, 3D) interconnecting said conductor sections for forming a plurality of transmission cross-links at said interfaces, and a plurality of access conductor sections (1B, 1C, 2B, 2C) connecting said master controllers and said a slave valve controllers to certain of said interfaces in said ring circuit.

3. The closed loop control system of claim 2, wherein said interfaces are conductor junctions or optical couplers.

4. The closed loop control system of claim 1, comprising at least two air discharge valves, at least two master controllers for each of said two air discharge valves, at least two slave valve controllers for each of said two air discharge valves, and wherein said ring circuit forming said information transmission loop comprises interlinked information transmission paths for controlling anyone of said slave valve controllers through any one of said master controllers whereby in an emergency an operable yet shortest possible transmission path can bypass a currently inoperable transmission path.

5. The closed loop control system of claim 4, further comprising additional linking transmission paths in said ring circuit for increasing the number of possible bypass transmission paths.

6. The closed loop control system of claim 1, wherein said ring circuit comprises at least four interfaces arranged in pairs (3A, 3D and 3B, 3C), a plurality of first conductor sections (3E, 3G) interconnecting said interfaces (3A, 3D; 3B, 3C) forming pairs, second conductor sections (3F, 3H) cross-linking said interfaces (3A, 3B; 3C, 3D) thereby closing said ring circuit and ring entering and exiting third conductor sections (1B, 2B, 2C, 1C) connecting said slave valve controllers and said master controllers to said ring circuit.

7. The closed loop control system of claim 6, wherein said first, second and third conductor sections are insulated electrical conductors and said interfaces are electrical junctions.

8. The closed loop control system of claim 6, wherein said first, second and third conductors sections are lightwave conductors and said interfaces are fiber optical couplers.

9. The closed loop control system of claim 6, wherein said first, second and third conductor sections are bidirectional databus conductors.

10. The closed loop control system of claim 1, wherein said ring circuit forming said information transmission loop comprises at least one conductor mesh network (3') including intermeshing interfaces in said mesh network and conductor sections interconnected by said interfaces, wherein any interface is intermeshed with any other interface in said conductor mesh network.

11. The closed loop control system of claim 1, wherein each of said master controllers comprises an information evaluating logic circuit for determining faulty system sections in response to received information and for providing respective control signals that cause bypassing any faulty system sections along said shortest possible conductor paths.

12. The closed loop control system of claim 11, wherein said information for evaluation by said logic circuit is feedback information from said slave valve controllers.

* * * * *